Nov. 26, 1946.   T. D. LANE   2,411,629
BOLT AND MOUNTING THEREFOR
Filed July 17, 1943
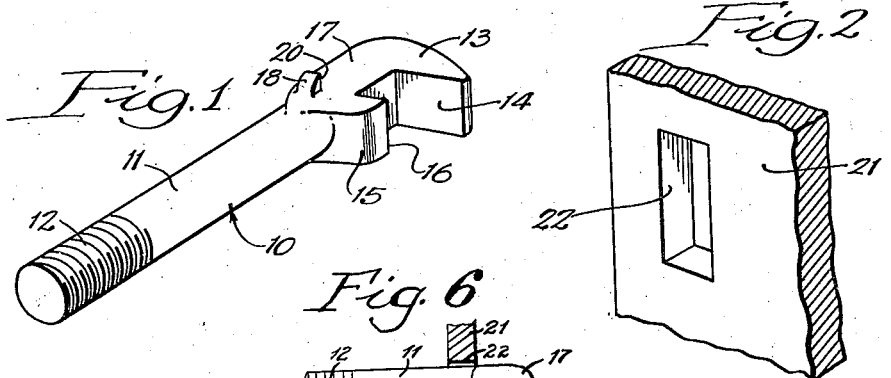
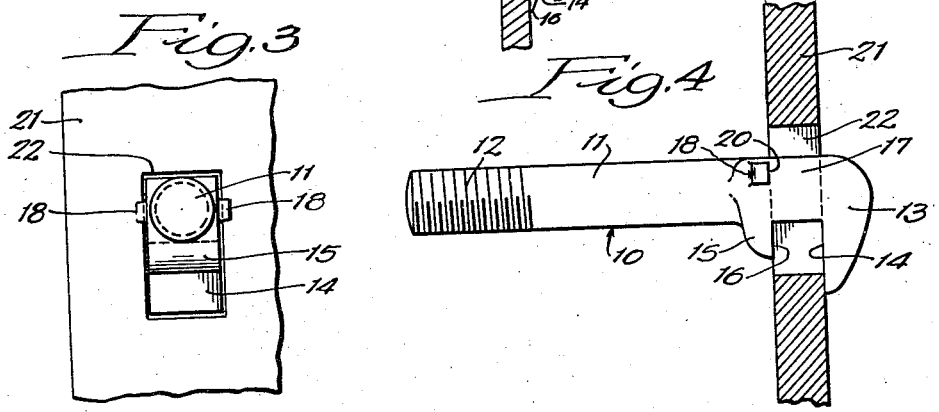
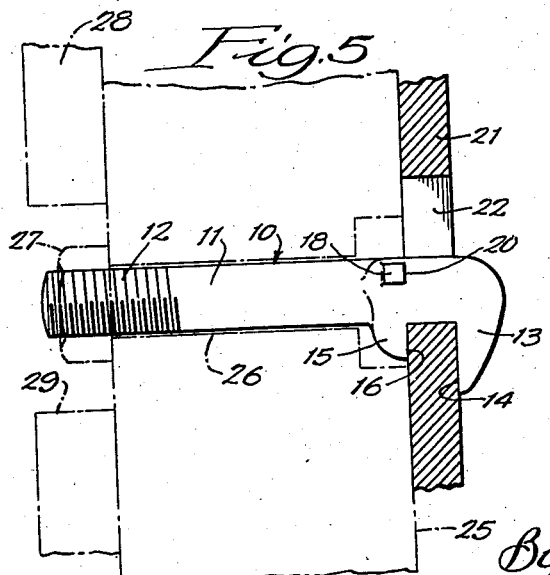
Inventor:
Thomas D. Lane,
By McCaleb, Nead & Dickinson
Attorneys Patented Nov. 26, 1946

2,411,629

UNITED STATES PATENT OFFICE 2,411,629

BOLT AND MOUNTING THEREFOR

Thomas D. Lane, Winnetka, Ill., assignor to MacLean-Fogg Lock Nut Company, Chicago, Ill., a corporation of Illinois Application July 17, 1943, Serial No. 495,169

4 Claims. (Cl. 189—35)

My invention relates to bolts and mountings therefor, and more especially to bolts to be firmly mounted in mounting slots in plate-like members to maintain the bolts outstanding therefrom, even in the absence of other structure, ready to receive whatever is to be mounted on or secured by the bolts.

One object of my invention is a bolt and mounting therefor which requires but a small and narrow hole in the mounting plate so that the bolt need not be substantially weakened by the hole and so that the bolt may, where more convenient, be placed closer to the edge of the plate, and yet where the bolt does not require rocking or rotation for its installation, whereby the bolt may be mounted in closer proximity to a ceiling or floor, ledge, or other overhanging structure than where it is necessary to rock the bolt or rotate a T head which requires greater clearance for the movement of the bolt itself or for the workman's hand or a tool for effecting the movement.

Another object of my invention is a more convenient accurate register of the thickness of the plate with opposed jaws of a bolt preliminary to driving the bolt into its seat upon a margin of the slot.

Still another object of my invention is a bolt of the type referred to, having a design which is simpler to form.

Another object of the invention is the provision of a plurality of different modifications of the bolts all of which are adapted to accomplish the same results and all of which are adapted to be manufactured at low cost.

The foregoing, together with further objects, features, and advantages of my invention, are set forth in the following description of specific embodiments thereof, illustrated in the accompanying drawing, wherein:

Fig. 1 is a perspective view of the bolt;

Fig. 2 is a perspective view of a fragment of the mounting plate showing the mounting slot therein;

Fig. 3 is a side elevation of the plate showing, in end elevation, the bolt as its head is being passed through the mounting slot;

Fig. 4 is a side elevation of a bolt and vertical section of the mounting plate showing a slightly subsequent stage of the installation of the bolt;

Fig. 5 is a view similar to Fig. 4, but showing the final installation of the bolt upon the mounting plate; and Fig. 6 is a side elevation of a modified bolt and vertical section of the mounting plate showing installation of the bolt from the rear.

Referring to Fig. 1, the bolt 10 of my invention comprises a shank 11 inwardly threaded from its end at 12, an L shaped head 13 presenting a forwardly facing shoulder 14 at a normal to the axis of the bolt, and a jaw 15 presenting a rearwardly facing shoulder 16 parallel with, and opposing, shoulder 14. The head 13 and jaw 15 are flattened on their lateral sides to a thickness approximating—but preferably a little greater than—the diameter of the shank. These lateral faces of the head and jaw are preferably coplanar with the lateral surfaces of the intermediate region, whereby to form a squared neck 17 between the jaw and head. The bolt may optionally carry, on its lateral sides, and distant from the jaw 15, stops 18 presenting rearwardly facing abutments 20 in the plane of the jaw shoulder 16. In general form the bolt is somewhat wrench shaped.

Referring to Fig. 2, the mounting plate 21 has a rectangular mounting slot 22 formed therethrough and, as shown, this may be rather close to the edge of the plate. The width of the mounting slot 22 is preferably just sufficient to pass the head 13 and snugly receive the squared neck 17. In length the slot 22 may be only a trifle longer than the transverse length of the head 13, although, as will later be explained, the mounting slot 22 may be even shorter than the length of the head if the bolt is to be rocked into the slot.

The manipulation for installing the bolt in the mounting slot is shown in progressive stages by Figs. 3, 4, and 5. The bolt is held with its axis at a normal to the plane of the mounting plate and with its head in registry with the slot 22 and then shifted inwardly to pass the head through the slot. If the stops 18 are employed, they serve to limit the axial shifting of the bolt to stop it at a position where the shoulder 14 of the head 13 comes in the plane of the back side of the plate. Then the bolt is dropped down a fraction of an inch to the position of Fig. 4, where the terminal of the head 13 slightly overlaps the lower margin of the slot, but the terminal of the jaw 15 does not. The installation thus far may be accomplished entirely by the hand engaging the shank. An upward rocking movement applied to the shank will cause the terminal edge of the shoulder 14 to engage the back face of the plate and the stops 18 to engage the front face, bringing the space between the opposed shoulders 14 and 16 into more accurate registry with the thickness of the plate with which it is adapted to make a tight or driving fit.

With the outstanding end of the shank still engaged in the hand and subject to an upward rocking push, a hammer blow is administered to the shank adjoining the plate to drive the bolt downwardly until the bottom margin of the slot is firmly seated in the gap between the head shoulder 14 and jaw shoulder 16. The rocking pressure described serves to keep the terminal edge of the jaw 15 from engaging the bottom edge face of the slot and deforming the jaw or slot or otherwise impeding the seating of the bolt.

If the stops 18 are not employed, the technique of installation is varied slightly. The bolt is held in the position of Fig. 4 at a normal to the plate, but without the upward rocking thrust on the shank, using only the shoulder 14 of the head as a guide to cause the lower margin of the slot to enter the gap between the head and jaw as the bolt is seated by a hammer blow.

Downward rocking of the bolt, when installed, is resisted by the jaw 15 and by the tight fit of the plate in the gap between the jaw and head. Upward rocking is resisted by the jaw-like extension of the head 13 and the stops 18, as well as by the tight fit of the thickness of the plate in the gap between the head and shoulder. Lateral rocking is resisted in part by said mentioned tight fit and in part by the contact of the lateral edges of the slot with the lateral faces of the squared edge 17. Inward axial shifting of the bolt is resisted by the stops 18 and the shoulder 15. Outward axial shifting is resisted by the head. Thus the bolt is firmly mounted at its head end in the plate with the threaded end outstanding from the plate in fixed position relative thereto.

I have indicated in Fig. 5, as an exemplary use of the bolt, a furring strip 25 to be clamped to the plate 21 when the latter is the inward flange of a vertical post Z shaped in cross section framing a steel box car. The flange would carry a plurality of vertically spaced slots 22 and the furring strip 25 would carry correspondingly spaced preformed holes 26 to receive the bolts simultaneously when the strip is moved against the plate. A nut 27 is then turned onto the threads 12 at the end of each bolt to clamp the furring strips. Lining boards or a lining panel 28 may then be nailed to the furring strips 25, and may contain holes 29 for access. Thereafter, by removing the nut 27 from each bolt, the lining planks or panels together with the furring strips may be removed as a unit without disturbing their nailed-together relationship; and they can likewise be replaced as a unit upon the bolts.

The stops 18 may perform the five-fold functions of: precluding the bolt passing wholly through the slot 22 and falling down behind the plate; stopping the bolt, when axially shifted into the slot at a normal to the plate, so that the head shoulder 14 is positioned in the plane of the back side of the plate before the bolt is shifted downwardly from the position of Fig. 3 to the position of Fig. 4; limiting upward rocking movement of the bolt when in the position of Fig. 4 to register the gap between the shoulders 14 and 16 with the thickness of the plate at the margin of the slot; resisting upward rocking of the bolt when in its installed position of Fig. 5; and withholding the bolt from shifting rearwardly when the bolt is subjected to a rearward blow or pressure. This latter function is shared by the jaw shoulder 16. But where there is only one jaw shoulder 16, since it is radially beyond the bolt, an axial thrust on the bolt is apt to be resolved into a tendency to an upward swing about the jaw shoulder 16 as a fulcrum, but the pair of lateral stops 18 resist any such tendency.

Despite these advantageous functions of the stops 18, they are not essential. When the stops are omitted, as shown in Fig. 6 the bolt may be inserted into the slot shank first, if there be room behind the plate and convenient access for the workman. If the bolt is thus to be installed from the back, the length or height of the slot 22 may be reduced, since it has to pass only the shank and jaw 15 rather than the head 13.

The slot 22 may also be made somewhat shorter than shown in Figs. 3 and 4, even for installation of the bolt from the front, if, instead of inserting the bolt by axially shifting it at a normal to the plane of the plate, it be hooked into the slot by holding the bolt at an angle of about 45 degrees with its outer end down while passing the head through the slot and then, when the jaw 15 engages the margin of the slot, rocking the bolt up to horizontal position and then driving it downwardly to seat upon the thickness of the plate.

It will thus be observed that I have invented a number of forms of bolts which are adapted to be firmly secured to a metal plate by merely inserting the bolt in an aperture and driving the jaws of the bolt over the adjacent parts of the plate. The present bolts are used in securing furring strips to the wall of a refrigerator car.

While I have illustrated and described a preferred embodiment of the invention my modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A bolt to be mounted at its head end in a rectangular slot in a mounting plate or the like firmly to outstand therefrom even in the absence of other structure and comprising, in combination, a shank inwardly threaded from its outer end, a head at the other end of the shank consisting of a jaw-like extension on only one side of the shank presenting a forwardly facing shoulder substantially perpendicular to the axis of the bolt, said head having a width substantially equal to that of the shank, the end of said head being rounded at the corner opposite said jaw-like extension so that the head may be passed through said slot from an angular position and then swung to a position in which said shank is normal to the plate and said shoulder embraces the rear surface of the plate, a jaw extending from the same side of the shank as the head and presenting a rearwardly facing shoulder opposed and parallel to said forwardly facing shoulder, said shoulders being spaced apart to receive and grip said plate, said jaw being sufficiently shorter than the head that said forwardly facing shoulder engages the rear surface of the plate independently of the jaw during placement to serve as a guide and that said jaw does not prevent said swinging of the bolt to said position normal to the plate, and a neck of rectangular section between the head and the jaw adapted to fit into said slot and prevent rotation of the bolt relative to the plate.

2. A bolt as defined in claim 1 and which additionally includes laterally projecting stop lugs of relatively small section on opposite sides of the bolt and spaced from the projecting end of the jaw, said stops presenting rearwardly facing abutments adapted to lie against the front of the plate at the lateral margins of the slot.

3. The combination with a plate or the like having a rectangular mounting slot therethrough, of a bolt firmly mounted at its head end in the slot to outstand from the plate even in the absence of other structure, the bolt comprising a pair of jaws extending outwardly from the bolt at the same side thereof and presenting opposed shoulders spaced apart to make tight flatwise engagement with the front and back sides of the plate adjoining an end margin of the slot, a neck between the jaws and laterally substantially coplanar therewith and lying in the slot with one side of the neck engaging an edge of the slot to restrain the bolt from rotation therein, the overhanging of the head beyond the neck being confined to said jaw at one side of the bolt, and the slot being of a size to pass the shank and jaw therethrough from the back side of the plate but not the head.

4. The combination with a plate or the like having a rectangular mounting slot therethrough, of a bolt firmly mounted at its head end in the slot to outstand from the plate even in the absence of other structure, the bolt comprising a pair of jaws extending outwardly from the bolt at the same side thereof and presenting opposed shoulders spaced apart to make tight flatwise engagement with the front and back sides of the plate adjoining an end margin of the slot, a neck between the jaws and laterally substantially coplanar therewith and lying in the slot with one side of the neck engaging an edge of the slot to restrain the bolt from rotation therein, the overhanging of the head beyond the neck being confined to said jaw at one side of the bolt, and the forward jaw shoulder being considerably longer than the rearward jaw shoulder.

THOMAS D. LANE.